US009286185B2

(12) United States Patent
Ur et al.

(10) Patent No.: US 9,286,185 B2
(45) Date of Patent: Mar. 15, 2016

(54) MONITORING A PERFORMANCE OF A COMPUTING DEVICE

(71) Applicant: EMPIRE TECHNOLOGY DEVELOPMENT, LLC, Wilmington, DE (US)

(72) Inventors: Shmuel Ur, Galil (IL); Mordehai Margalit, Zichron Ya'aqov (IL); Benjamin Maytal, Mevaseret-Zion (IL); Vlad Grigore Dabija, Mountain View, CA (US); Noam Meir, Herzlia (IL)

(73) Assignee: Empire Technology Development LLC, Wilmington, DE (US)

( * ) Notice: Subject to any disclaimer, the term of this patent is extended or adjusted under 35 U.S.C. 154(b) by 151 days.

(21) Appl. No.: 13/995,794

(22) PCT Filed: Nov. 16, 2012

(86) PCT No.: PCT/US2012/065438
§ 371 (c)(1),
(2) Date: Jun. 19, 2013

(87) PCT Pub. No.: WO2014/077829
PCT Pub. Date: May 22, 2014

(65) Prior Publication Data
US 2014/0143410 A1    May 22, 2014

(51) Int. Cl.
*G06F 15/173*    (2006.01)
*G06F 11/34*    (2006.01)

(52) U.S. Cl.
CPC ........ *G06F 11/3466* (2013.01); *G06F 11/3409* (2013.01); *G06F 2201/865* (2013.01)

(58) Field of Classification Search
CPC .............. H04L 41/048; H04L 41/0681; G06F 17/30424; G06F 11/22; G06F 11/3466
USPC ..................... 709/202, 224; 714/46; 717/125; 707/713; 718/100, 104
See application file for complete search history.

(56) References Cited

U.S. PATENT DOCUMENTS 6,553,403 B1 * 4/2003 Jarriel et al. .................. 709/202
6,904,594 B1    6/2005 Berry et al.
(Continued)

FOREIGN PATENT DOCUMENTS

GB    2368689 B    12/2004

OTHER PUBLICATIONS

International Search Report and Written Opinion for PCT application with application No. PCT/US12/65438, dated May 6, 2013, 53 pages.

*Primary Examiner* — Dustin Nguyen
(74) *Attorney, Agent, or Firm* — Moritt Hock & Hamroff LLP; Steven S. Rubin, Esq.

(57) ABSTRACT

Technologies are generally described for systems, methods and devices configured to monitor a performance of a resource of a device. In some examples, a processor may receive an application code. The application code may include at least one application thread configured to implement at least one task for the application code. The application code may be configured to spawn a performance thread. The processor may execute the application thread on the computing device. The application thread may be configured to use at least one resource of the computing device. The processor may further execute the performance thread on the computing device. The performance thread may be configured to calculate a value relating to the resource.

16 Claims, 6 Drawing Sheets

(56) References Cited

U.S. PATENT DOCUMENTS

| | | |
|---|---|---|
| 7,467,267 B1 | 12/2008 | Mayock |
| 8,185,619 B1 * | 5/2012 | Maiocco et al. .............. 709/224 |
| 2003/0115509 A1 * | 6/2003 | Dubal ............................ 714/46 |
| 2004/0064552 A1 | 4/2004 | Chong et al. |
| 2005/0235054 A1 * | 10/2005 | Kadashevich ...... G06F 11/3466 709/223 |
| 2006/0095909 A1 | 5/2006 | Norton et al. |
| 2008/0244590 A1 | 10/2008 | Chambliss et al. |
| 2010/0125565 A1 * | 5/2010 | Burger et al. ................. 707/713 |
| 2012/0066378 A1 | 3/2012 | Lui et al. |
| 2012/0089724 A1 | 4/2012 | Liang |
| 2012/0089726 A1 | 4/2012 | Doddavula |
| 2012/0124559 A1 * | 5/2012 | Kondur ........................ 717/125 |
| 2012/0278793 A1 | 11/2012 | Jalan et al. |

* cited by examiner

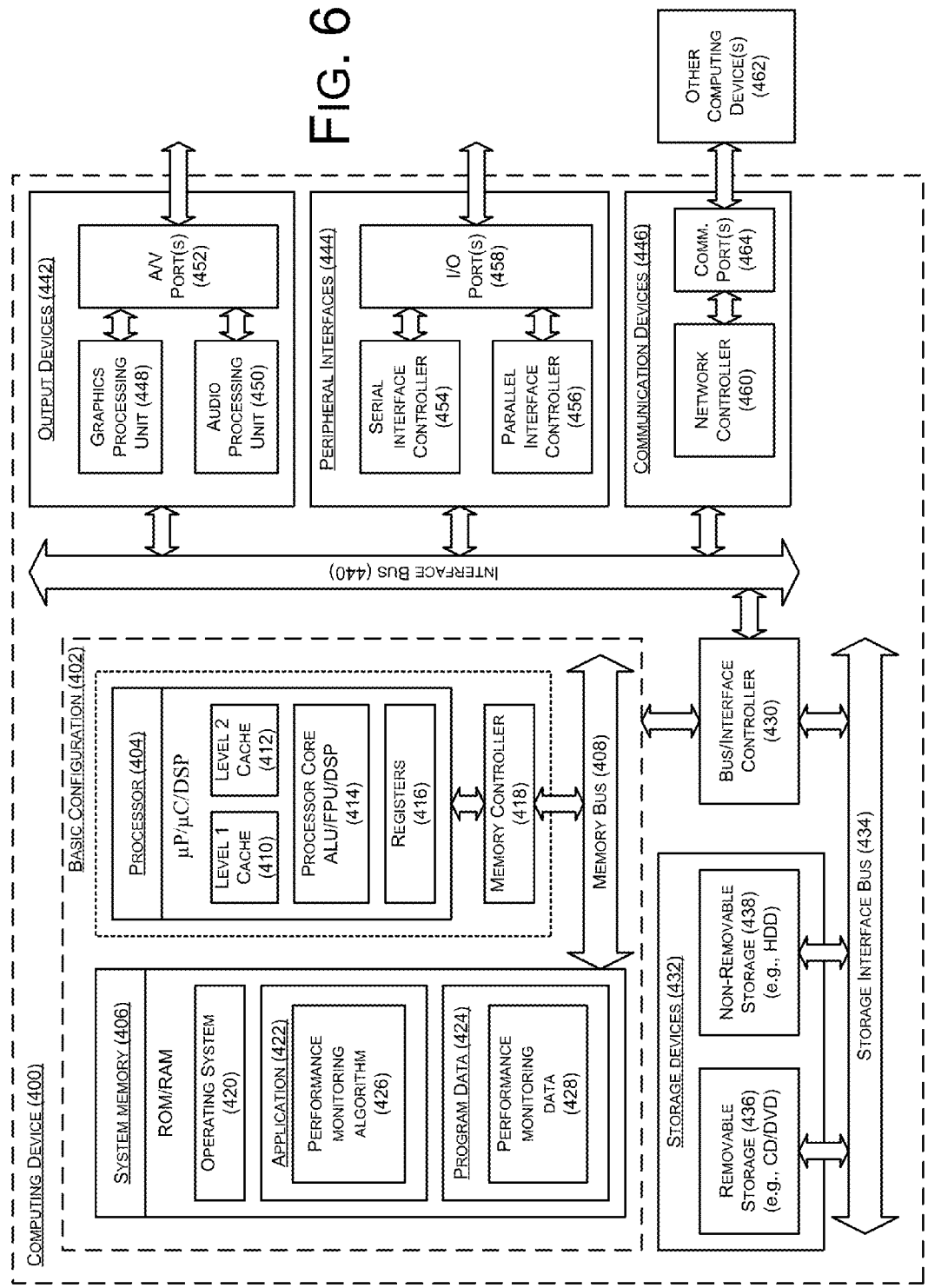

MONITORING A PERFORMANCE OF A COMPUTING DEVICE

CROSS REFERENCE TO RELATED APPLICATION

This application is a U.S. National Stage filing under 35 U.S.C. §371 of International Application No. PCT/US12/65438 filed Nov. 16, 2012, the entirety of which is hereby incorporated by reference.

BACKGROUND

Unless otherwise indicated herein, the materials described in this section are not prior art to the claims in this application and are not admitted to be prior art by inclusion in this section.

A first computing device may send an application code to be executed on a second computing device. The second computing device may execute the application code using resources that may be defined by a service level agreement (SLA). For example, the service level agreement may indicate that certain processing, memory, or network communication values are to be provided by the second computing device to execute the application code.

SUMMARY

In an example, a method for monitoring a performance of a resource of a computing device is generally described. The method may include receiving an application code. The application code may include at least one application thread configured to implement at least one task for the application code. The application code may be configured to spawn a performance thread. The method may further include executing the application thread on the computing device. The application thread may be configured to use at least one resource of the computing device. The method may further include executing the performance thread on the computing device. The performance thread may be configured to calculate a value relating to the resource.

In an example, a device configured to monitor a performance of a resource of the device is generally described. The device may include a memory and a processor configured to be in communication with the memory. The processor may be configured to receive an application code. The application code may include at least one application thread configured to implement at least one task for the application code. The application code may be configured to spawn a performance thread. The processor may be configured to execute the application thread on the computing device. The application thread may be configured to use at least one resource of the computing device. The processor may be configured to execute the performance thread on the computing device. The performance thread may be configured to calculate a value relating to the resource.

In an example, a system configured to monitor a performance of a resource of a computing device is generally described. The system may include a first computing device, a network, and a second computing device configured to be in communication with the first computing device over the network. The first computing device may be configured to send an application code to the second computing device. The application code may include at least one application thread configured to implement at least one task for the application code. The application code may be configured to spawn a performance thread. The second computing device may be configured to receive the application code. The second computing device may be configured to execute the application thread on the second computing device. The application thread may be configured to use at least one resource of the computing device. The second computing device may be configured to execute the performance thread on the second computing device. The performance thread may be configured to calculate a value relating to the resource.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 is a block diagram illustrating an example computing device that is arranged to implement monitoring a performance of a computing device, all arranged according to at least some embodiments described herein.

DETAILED DESCRIPTION

Figure 1:
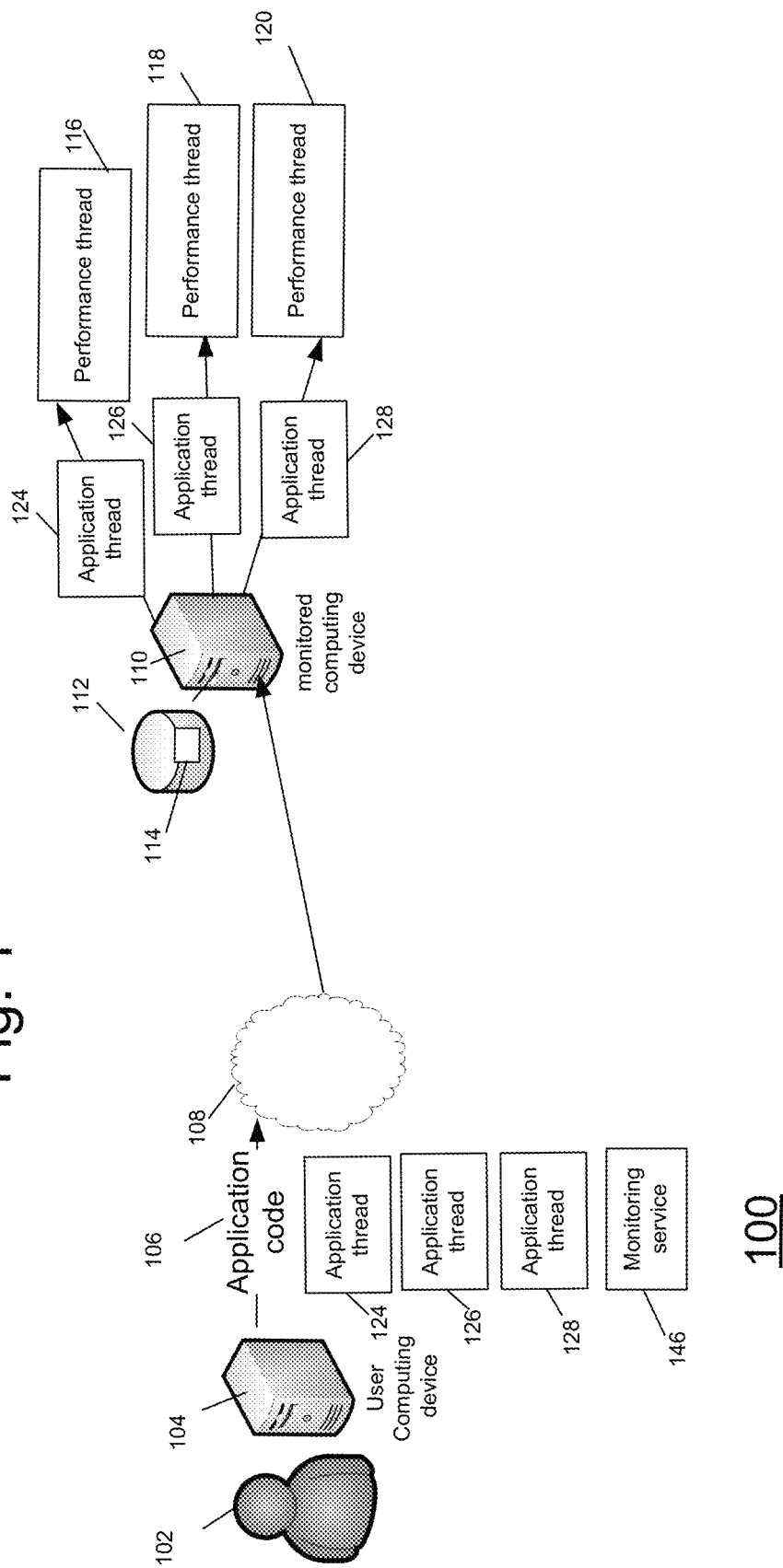
FIG. 1 illustrates some example systems that can be utilized to implement monitoring a performance of a computing device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to monitoring a performance of a computing device.

Briefly stated, technologies are generally described for systems, methods and devices configured to monitor a performance of a resource of a device. A processor may receive an application code. The application code may include at least one application thread configured to implement at least one task for the application code. The application code may be configured to spawn a performance thread. The processor may execute the application thread on the computing device. The application thread may be configured to use at least one resource of the computing device. The processor may further execute the performance thread on the computing device. The performance thread may be configured to calculate a value relating to the resource.

FIG. 1 illustrates some example systems that can be utilized to implement monitoring a performance of a computing device arranged according to at least some embodiments described herein. In some examples, as explained in more detail below, a system 100 may include a user computing device 104 and/or a monitored computing device 110 arranged to be in communication with each other such as through a network 108. As discussed in more detail below, a user 102 may generate an application code 106, using user computing device 104. User computing device 104 may send application code 106 over network 108 to monitored computing device 110. Monitored computing device 110 may execute application code 106. Monitored computing device 110 may be configured to be in communication with a memory 112 including instructions 114.

As discussed in more detail below, application code 106 may include two or more application threads 124, 126 and/or 128. Application threads 124, 126 and/or 128 may be effective to implement some tasks for application code 106. In examples where monitored computing device 110 receives application code 106, application threads 124, 126 and/or 128 may be executed by monitored computing device 110. Application code 106 or one or more application threads 124, 126, 128, may spawn one or more performance threads 116, 118 and/or 120. For example, user computing device 104 may add a monitoring service 146 to application code 106 to cause a spawning of performance threads 116, 118, 120. Performance threads 116, 118 and/or 120 may be able to monitor a performance of monitored computing device 110 by monitoring the performance of resources of computing device 110.

Figure 2:
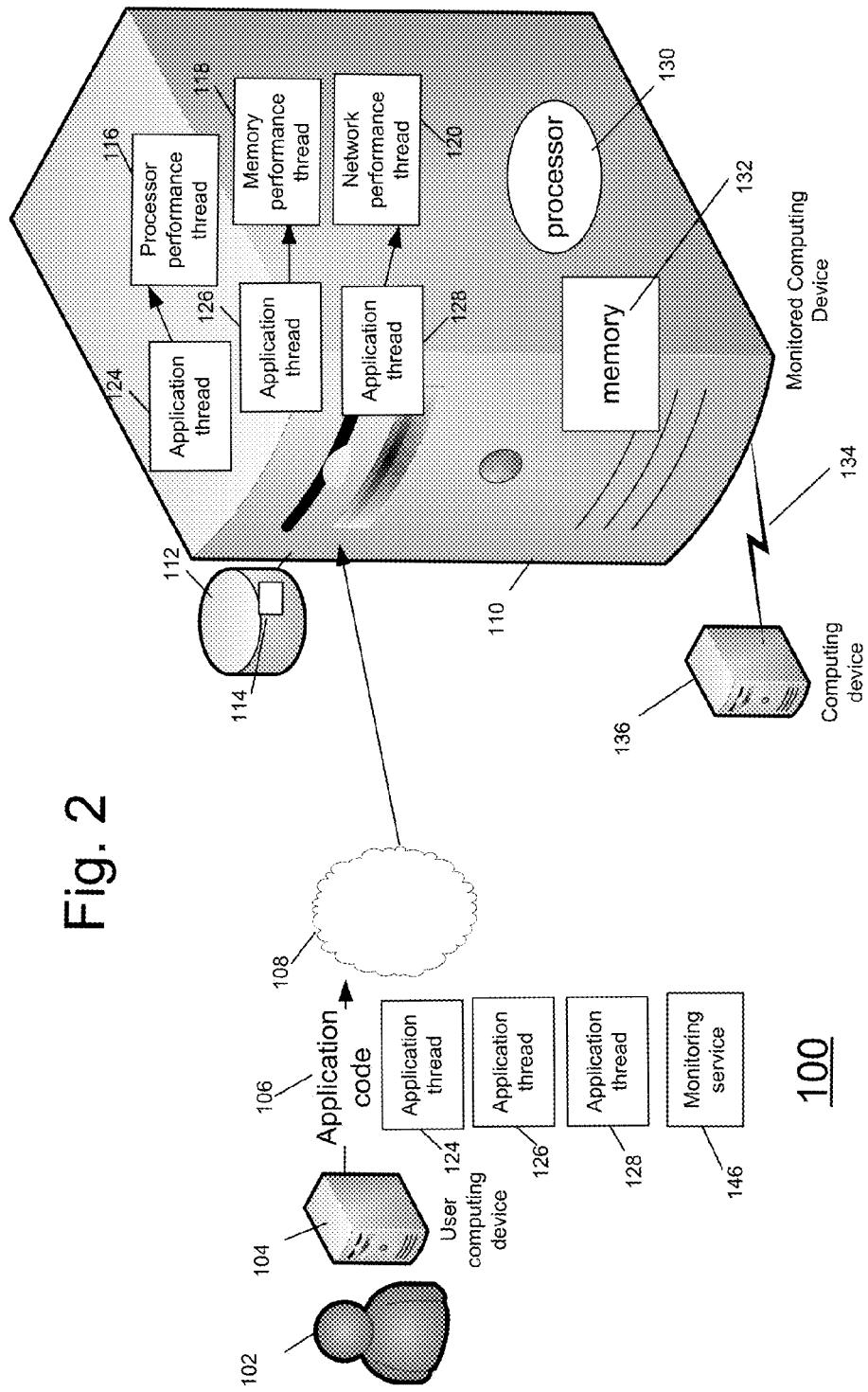
FIG. 2 illustrates some example systems that can be utilized to implement monitoring a performance of a computing device.

FIG. 2 illustrates some example systems that can be utilized to implement monitoring a performance of a computing device arranged according to at least some embodiments described herein. Those components in FIG. 2 that are labeled identically to components of FIG. 1 will not be described again for the purposes of clarity.

Monitored computing device 110 may include a memory 132 and one or more processors 130. Monitored computing device 110 may be configured to be in communication with another computing device 136 through a communication link 134. Application code 106 may be configured to use one or more of memory 132, processor 130 and/or communication link 134 of monitored computing device 110.

Performance threads 116, 118, 120 may each be configured to monitor a performance of one or more resources of processor 130. For example, performance thread 116 may be a processor performance thread configured to monitor a performance of processor 130. For example, processor performance thread 116 may periodically send a calculation request to processor 130. Examples of calculation requests may include requests to perform a particular mathematical computation. A simple example of a calculation request may be to perform a square root of a large number. Another example of a calculation request may be to perform matrix multiplication with a floating point number. Such a calculation request may monitor a floating point performance of processor 130.

As discussed in more detail below, processor performance thread 116 may determine a number of calculation responses returned by processor 130 in a particular time period. The calculation responses may be, for example, responses to the calculation requests. If the calculation request is a request to perform a mathematical computation, the calculation response may be the result of the computation. For example, if the calculation request is a request to perform a square root of a large number, the calculation response may be the square root. Processor performance thread 116 may also generate and save historical data relating to a number of calculation responses over a period of time. The historical data may be used to calculate an average number of calculation responses during the period of time. If the number of calculation responses in the particular time period changes by a threshold from the average number of calculation responses, an alert may be generated based on an alert policy.

Performance thread 118 may be a memory performance thread configured to measure a performance of memory 132. Memory performance thread 118 may measure a performance of memory 132 such as by performing a number of read or write requests to memory 132 in a particular time period. For example, memory performance thread 118 may continually generate a request to read data from a particular location in memory 132. In an example, the requests may be to read data from a single cache line or lines. In some examples, the cache lines may be lines not accessed by application threads 124, 126, 128. Memory performance thread 118 may then maintain a count of the number of times the data is read from the location in memory over a period of time. Memory performance thread 118 may also generate and save historical data relating to read or write requests to memory 132 over a period of time. The historical data may be used to calculate an average number of read or write requests during a period of time. If the number of read or write requests performed in the particular time period changes by a threshold from the average number of read or write requests, an alert may be generated based on an alert policy.

In another example, memory performance thread 118 may generate a set number (e.g. 100) of requests to read data. Memory performance thread 118 may determine a first time needed to perform the set number of requests during a first time period. Memory performance thread 118 may also determine a second time needed to perform the set number of requests during a second time period. If the second time differs from the first time by an amount greater than a threshold, an alert may be generated based on an alert policy.

Performance thread 120 may be a network performance thread designed to measure a communication performance of communication link 134. Network performance thread 120 may measure a performance of communication link 134 such as by sending a query to computing device 136 and calculating a time to receive a response from computing device 136. For example, the query may be a request for a hypertext markup language (HTML) page stored on computing device 136. Network performance thread 120 may send the request for the HTML page to computing device 136 can calculate a time between sending the request and receiving the page from computing device 136. In another example, the query may be a ping request, such as a request including an Internet control message protocol echo request packet. The response may then be receipt of the Internet control message protocol from computing device 136. Network performance thread 120 may measure a number of ping requests sent and responses received during a period of time. Network performance thread 120 may also generate and save historical data relating to times between queries sent to computing device 136 and receipt of responses from computing device 136 over a period of time. The historical data may be used to calculate an average time to receive a response. If the time to receive a particular response changes by a threshold from the average time to receive a response, an alert may be generated based on an alert policy.

Figure 3:
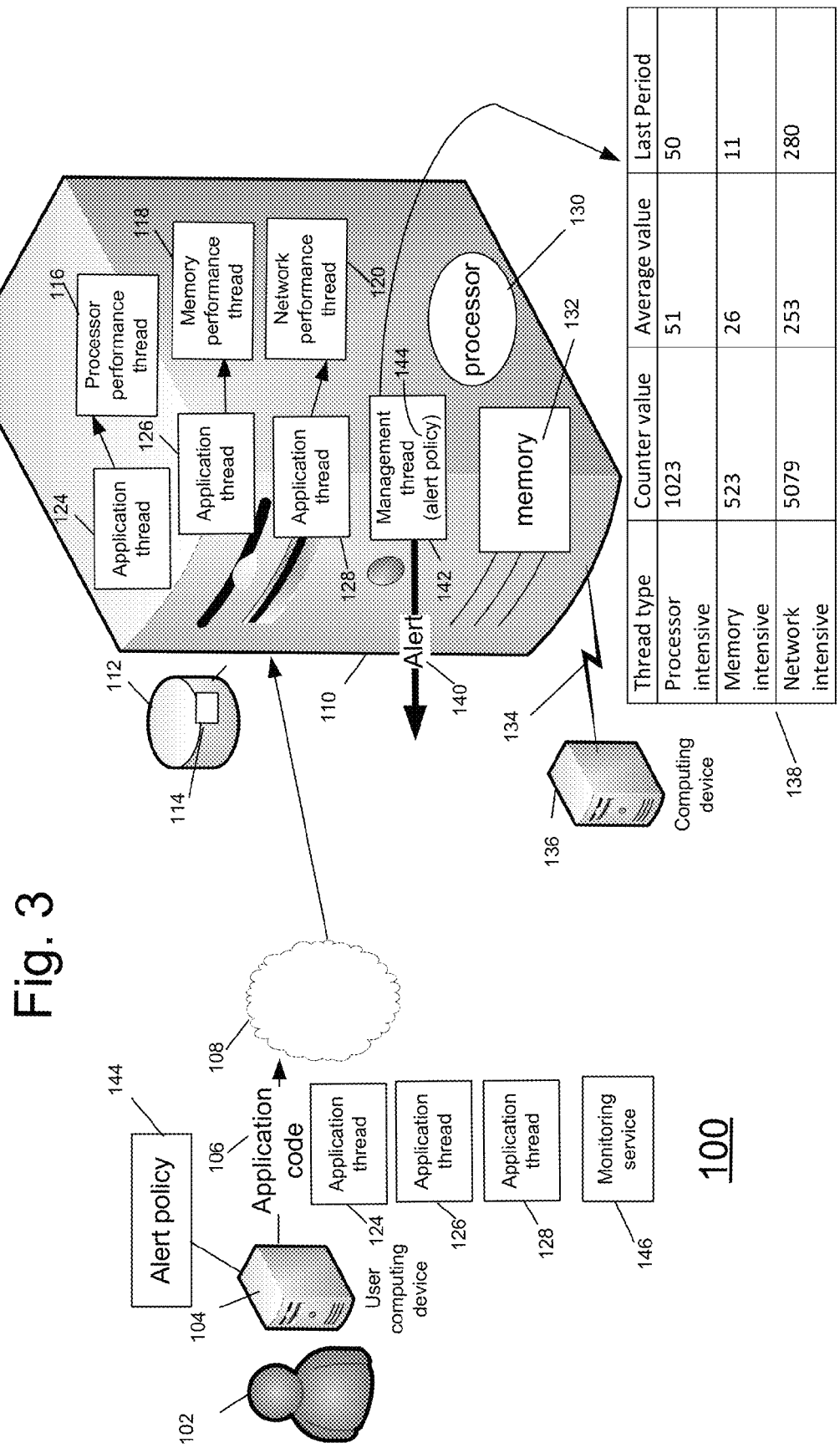
FIG. 3 illustrates some example systems that can be utilized to implement monitoring a performance of a computing device.

FIG. 3 illustrates some example systems that can be utilized to implement monitoring a performance of a computing device arranged according to at least some embodiments described herein. Those components in FIG. 3 that are labeled identically to components of FIGS. 1 and 2 will not be described again for the purposes of clarity.

Application code 106 may further spawn a management thread 142. Management thread 142 may be configured to manage performance threads 116, 118, 120 and may generate an alert 140 based on an alert policy 144. In another example, management thread 142 may be implemented by one of the performance threads 116, 118, 120. As discussed herein, performance threads 116, 118, 120 may be configured to monitor a performance of resources in processor 130. Performance threads 116, 118, 120 may operate while application threads 124, 126, 128 are running. In another example, performance threads 116, 118, 120 may operate during time intervals when application threads 124, 126, 128 are not actively running. Management thread 142 may receive data from performance threads 116, 118, 120 and generate a performance table 138 in response. Performance table 138 may be stored in, for example, memory 132. For example, performance table 138 may include fields such as "Thread type", "Counter value", "Average value", and/or "Last Period". Data in the field "Thread type" may include the different types of resources of processor 130 being monitored. For example, the thread type field may include "Processor intensive" relating to performance of processor 130, "Memory intensive" relating to a performance of memory 132, and/or "Network intensive" relating to a performance of communication link 134. Data in the "Counter Value" field may include a cumulative value calculated or measured for the resource for a period of time. Data in the "Last Period" field may include a value for data calculated or measured for the resource in a time period such as 1/100 of a second.

Management thread 142 may store measured values relating to each resource in performance table 138. In examples where a value of a resource in a last period is more than a threshold difference from an average value for that resource, management thread 142 may be configured to generate alert 140 in accordance with alert policy 144. In the example shown in FIG. 3, memory intensive measurements show a change from the average value "26" to last period "11". If this change is larger than a threshold, based on alert policy 144, management thread 142 may generate alert 140.

In another example, a different number of measurements may be performed in a first and a second time period by a performance thread. Results for the different measurements may be compared and may generate an alert. For example, in the first time period, 100 read requests to a memory may be performed. In the second time period, 200 read requests to the memory may be performed. When comparing results from the first and second time periods, if the time to perform 200 requests is not about double the time to perform 100 requests, then an alert may be generated.

In an example, measurements may be performed in a first and a second time period by a performance thread, where those the first and second time periods are different. The performance thread may measure the number of results in the first time period and in the second time period. If the second time period is about double the first time period, the number of results in the second time period should be about double the results in the first time period.

Alert policy 144 may be based on a service level agreement (SLA) between user 102 and a provider of processor 130. Alert policy 144 may be relative—such as generating alert 140 when a value relating to a resource is a multiple of the value relating to another resource. For example, an alert may be generated when a value relating to the processor resource is a multiple of a value relating to a memory resource. Alert 140 may be sent to user 102 and/or a provider of processor 130. Alert 140 may communicate to user 102 and/or a provider of processor 130 that a resource of processor 130 is not in compliance with the service level agreement.

In one example, performance threads 116, 118, and 120 may be spawned when a corresponding application thread 124, 126, 128 is generated. Performance threads 116, 118, 120 may be spawned by application code 106 and/or application threads 124, 126, 128. In another example, user 102 may send a request to user computing device 104 to spawn performance threads 116, 118, 120 when user 102 desires to monitor a performance of processor 130.

In one example, for each application thread, two or more performance threads may be spawned. For example, for application thread 124, processor performance thread 116, memory performance thread 118 and/or network performance thread 120 may be spawned. By spawning multiple performance threads for an application thread, resources for the respective application thread may be monitored. In another example, two or more performance threads may be spawned for an entire application code 106. By spawning multiple performance threads for an entire application code 106, less information regarding performance may be gathered but less information may be maintained by management thread 142. In one example, data in performance table 138 may be sent to user computing device 104 and user processor may decide whether to generate alert 140 based on alert policy 144.

Among other possible benefits, a system in accordance with the disclosure may be able to monitor a performance of a thread using resources of a computing device. A user may be able to determine whether an application code is receiving an amount of resources in accordance with a service level agreement. If another process is stealing clock cycles from a computing device, the system may be able to detect changes in a performance of the computing device. As the performance threads may be periodically monitoring a performance of resources, or may monitor performance when the application threads are inactive, the performance threads may have little effect on a performance of the resources. For example, a total time that a performance thread monitors a resource may be relatively small in comparison with the time where the corresponding application thread uses the resource.

As performance threads may be spawned by application threads, the performance threads may receive the same resources as the application threads. Hardware support for the performance threads may not be needed. The performance threads may thus generate valuable data regarding resources available to the application threads. Performance may be measured by a user using a resource or by a provider of a resource. The system may be used to determine that a resource in a computing device is not performing as required or to diagnose problems in a computing device. For example, certain systematic problems of the computing device may be determined and diagnosed.

Figure 4:
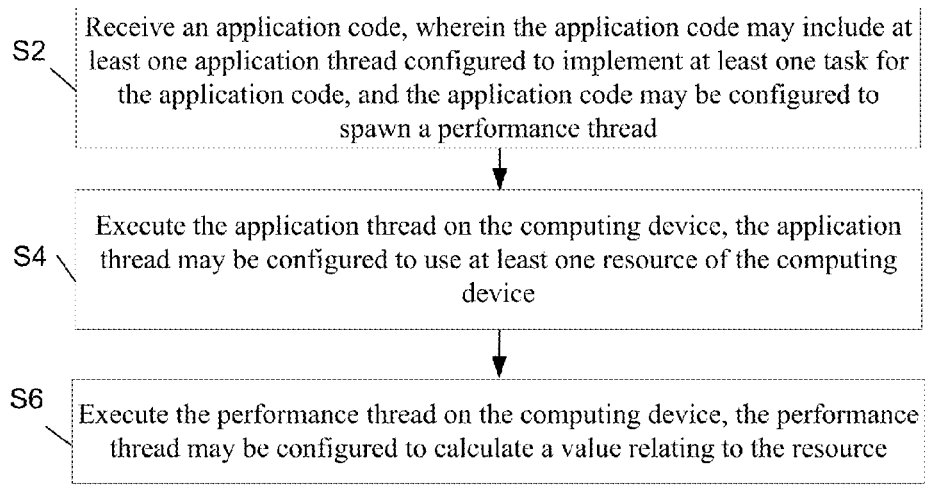
FIG. 4 depicts a flow diagram for example processes for implementing monitoring a performance of a computing device.

FIG. 4 depicts a flow diagram for example processes for implementing monitoring a performance of a computing device arranged in accordance with at least some embodiments described herein. The process in FIG. 4 could be implemented using, for example, system 100 discussed above and could be used to monitor a performance of a resource of a computing device. An example process may include one or more operations, actions, or functions as illustrated by one or more of blocks S2, S4 and/or S6. Although illustrated as discrete blocks, various blocks may be divided into additional blocks, combined into fewer blocks, or eliminated, depending on the desired implementation.

Processing may begin at block S2, "Receive an application code, wherein the application code may include at least one application thread configured to implement at least one task for the application code, and the application code may be configured to spawn a performance thread." At block S2, a processor may receive an application code. The application code may include an application thread configured to implement at least one task for the application code. The application code may be configured to spawn a performance thread. In an example, the application thread may spawn the performance thread. The performance thread may be spawned in response to a request by another computing device. Two or more performance threads may be spawned for each application thread.

Processing may continue from block S2 to block S4, "Execute the application thread on the computing device, the application thread may be configured to use at least one resource of the computing device." At block S4, the processor may execute the application thread on the computing device. The application thread may be configured to use at least one resource of the computing device.

Processing may continue from block S4 to block S6, "Execute the performance thread on the computing device, the performance thread may be configured to calculate a value relating to the resource." At block S6, the processor may execute the performance thread on the computing device. The performance thread may be configured to calculate a value relating to the resource.

The performance thread my send two or more calculation requests to a processor of the computing device. The performance thread may determine a number of calculation responses received during two or more time periods. The performance thread may generate an alert when a difference in a number of calculation responses in the time periods is above threshold.

The performance thread may generate requests to read data from, or write data to, a memory of the computing device in two or more time periods. The performance thread may determine a number of times that data is read from or written to the memory in the two or more time periods. The performance thread may determine a difference in a number of the read or write requests performed during the time periods and generate an alert in response. The performance thread may generate a set number of requests to read data and determine first and second times needed to perform the set number of requests during first and second time periods. If a difference between the first and second times is greater than a threshold, an alert may be generated.

The performance thread may send two or more queries to another computing device over a communication link. The performance thread may calculate times between sending the queries and receiving responses and generate an alert based on the respective times.

Figure 5:
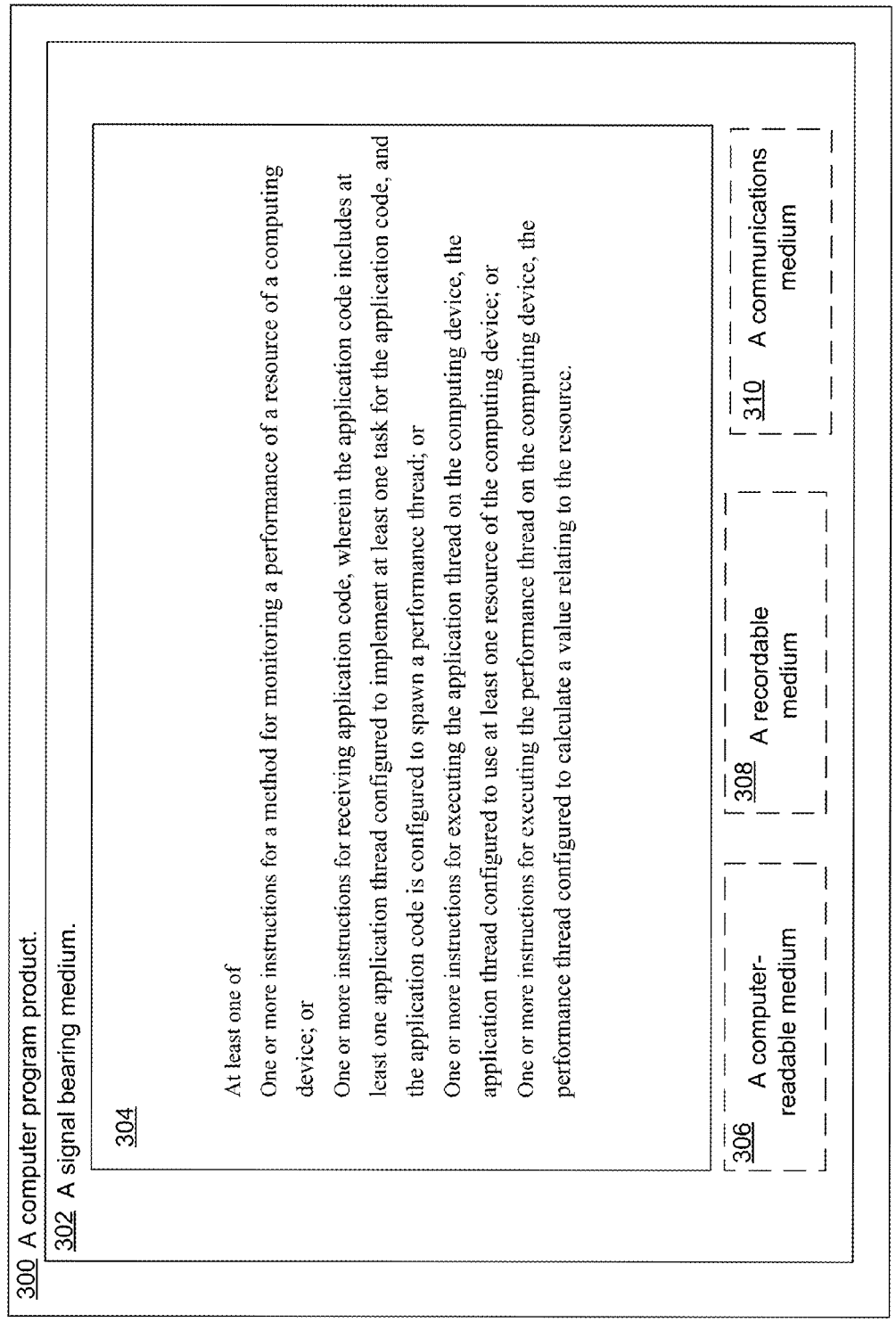
FIG. 5 illustrates a computer program product for implementing monitoring a performance of a computing device.

FIG. 5 illustrates a computer program product 300 for implementing monitoring a performance of a computing device arranged in accordance at least some embodiments described herein. Computer program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, monitored computing device 110 may undertake one or more of the blocks shown in FIG. 5 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 6 is a block diagram illustrating an example computing device 400 that is arranged to implement monitoring a performance of a computing device arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu$P), a microcontroller ($\mu$C), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a performance monitoring algorithm 426 that is arranged to perform the functions as described herein including those described previously with respect to FIGS. 1-5. Program data 424 may include performance monitoring data 428 that may be useful for implementing monitoring a performance of a computing device as is described herein. In some embodiments, application 422 may be arranged to operate with program data 424 on operating system 420 such that monitoring a performance of a computing device may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to monitor a performance of a resource of a computing device, the method comprising:
   receiving an application code, wherein the application code includes at least one application thread configured to implement at least one task for the application code, and the application code is configured to spawn a performance thread;
   executing the application thread on the computing device, the application thread configured to use at least one resource of the computing device;
   executing the performance thread of the application code on the computing device;
   wherein the performance thread is effective to perform the operations of:
      sending two or more calculation requests to a processor of the computing device;
      calculating a first value based on a first number of calculation responses received in a first time period;
      calculating a second value based on a second number of calculation responses received in a second time period;
      determining a difference between the first and the second values; and
      generating an alert when the difference is above a threshold.

2. The method of claim 1, wherein the application thread is configured to spawn the performance thread.

3. The method of claim 1, further comprising:
   performing a number of read or write requests to a memory of the computing device; and
   calculating the value based on the number of read or write requests.

4. The method of claim 1, wherein the difference is a first difference, the threshold is a first threshold, the alert is a first alert, and the method further comprising:
   performing a first number of read or write requests to a memory of the computing device in a first time period;
   performing a second number of read or write requests to the memory in a second time period;
   determining a second difference between the first and second numbers of read or write requests; and
   generating a second alert when the second difference is above a second threshold.

5. The method of claim 1, wherein:
   the computing device is a first computing device;
   and the method further comprises:
      sending a query from the first computing device to a second computing device over a communication link;
      receiving a response to the query from the second computing device;
      calculating a time between sending the query and receiving the response; and
      calculating the value based on the time between sending the query and receiving the response.

6. The method of claim 1, wherein the computing device is a first computing device, the difference is a first difference, the threshold is a first threshold, the alert is a first alert;
   and the method further comprises:
      sending a first query from the first computing device to a second computing device over a communication link;
      receiving a first response to the query from the second computing device;
      calculating a first time between sending the first query and receiving the first response;
      sending a second query from the first computing device to the second computing device over a communication link;
      receiving a second response to the query from the second computing device;
      calculating a second time between the second query and the second response;
      determining a second difference between the first and second time; and
      generating a second alert when the second difference is above a second threshold.

7. The method of claim 1, further comprising spawning the performance thread in response to a request by another computing device.

8. The method of claim 1, further comprising spawning two or more performance threads for each application thread.

9. A device configured to monitor a performance of a resource of the device, the device comprising:
   a memory;
   a processor configured to be in communication with the memory, the processor configured to:
      receive an application code, wherein the application code includes at least one application thread configured to implement at least one task for the application code, and the application code is configured to spawn a performance thread;
      execute the application thread on the computing device, the application thread configured to use at least one resource of the computing device;
      execute the performance thread of the application code on the computing device;
      wherein the performance thread is effective to perform the operations of:
         process two or more calculation requests;

calculate a first value based on a first number of calculation responses performed in a first time period;
calculate a second value based on a second number of calculation responses performed in a second time period;
determine a difference between the first and the second values; and
generate an alert when the difference is above a threshold.

10. The device of claim 9, wherein the application thread is configured to spawn the performance thread.

11. The device of claim 9, wherein the processor is configured to:
perform a number of read or write requests to a memory of the computing device; and
calculate the value based on the number of read or write requests.

12. The device of claim 9, wherein the difference is a first difference, the threshold is a first threshold, the alert is a first alert, and the processor is configured to:
perform a first number of read or write requests to a memory of the computing device in a first time period;
perform a second number of read or write requests to the memory in a second time period;
determine a second difference between the first and second numbers of read or write requests; and
generate a second alert when the second difference is above a second threshold.

13. The device of claim 9, wherein:
the computing device is a first computing device;
and wherein the processor is configured to:
send a query from the first computing device to a second computing device over a communication link;
receive a response to the query from the second computing device;
calculate a time between the query and the response; and
calculate the value based on the time between the query and the response.

14. The device of claim 9, wherein the difference is a first difference, the threshold is a first threshold, the alert is a first alert, and the computing device is a first computing device;
and the processor is configured to:
send a first query from the first computing device to a second computing device over a communication link;
receive a first response to the query from the second computing device;
calculate a first time between the first query and the first response;
send a second query from the first computing device to the second computing device over a communication link;
receive a second response to the second query from the second computing device;
calculate a second time between the second query and the second response;
determine a second difference between the first and second time; and
generate a second alert when the second difference is above a second threshold.

15. A system configured to monitor a performance of a resource of a computing device, the system comprising:
a first computing device;
a network;
a second computing device configured to be in communication with the first computing device over the network;
the first computing device configured to:
send an application code to the second computing device, wherein the application code includes at least one application thread configured to implement at least one task for the application code, and the application code is configured to spawn a performance thread;
the second computing device configured to:
receive the application code;
execute the application thread on the second computing device, the application thread configured to use at least one resource of the computing device;
execute the performance thread of the application code on the second computing device;
wherein the performance thread is effective to perform the operations of:
process two or more calculation requests;
calculate a first value based on a first number of calculation responses performed in a first time period;
calculate a second value based on a second number of calculation responses performed in a second time period;
determine a difference between the first and the second values; and
generate an alert when the difference is above a threshold.

16. The system of claim 15, wherein the difference is a first difference, the alert is a first alert, the threshold is a first threshold, and the second computing device is configured to:
perform a first number of read or write requests to a memory of the computing device in a first time period;
perform a second number of read or write requests to the memory in a second time period;
determine a second difference between the first and second number;
generate a second alert when the second difference is above a second threshold;
send a first query from the second computing device to a third computing device over a communication link;
receive a first response to the query from the second computing device;
calculate a first time between the first query and the first response;
send a second query from the first computing device to a second computing device over a communication link;
receive a second response to the second query from the second computing device;
calculate a second time between the second query and the second response;
determine a third difference between the first and second time; and
generate a third alert when the third difference is above a third threshold.

* * * * *